United States Patent
Han et al.

(10) Patent No.: US 12,056,244 B2
(45) Date of Patent: Aug. 6, 2024

(54) DEFERRED AUTHENTICATION IN A SECURE BOOT SYSTEM

(71) Applicant: HEWLETT PACKARD ENTERPRISE DEVELOPMENT LP, Houston, TX (US)

(72) Inventors: Jianpo Han, Beijing (CN); Yinzhi Dong, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 162 days.

(21) Appl. No.: 17/223,493

(22) Filed: Apr. 6, 2021

(65) Prior Publication Data
US 2022/0318391 A1 Oct. 6, 2022

(51) Int. Cl.
G06F 21/57 (2013.01)

(52) U.S. Cl.
CPC ...... G06F 21/575 (2013.01); *G06F 2221/034* (2013.01)

(58) Field of Classification Search
CPC .......................... G06F 21/575; G06F 2221/034
See application file for complete search history.

(56) References Cited

U.S. PATENT DOCUMENTS

| | | | |
|---|---|---|---|
| 8,499,171 B2 | 7/2013 | Mauro, II | |
| 8,788,839 B1 | 7/2014 | Dong et al. | |
| 9,177,153 B1 * | 11/2015 | Perrig | G06F 21/57 |
| 9,246,690 B1 * | 1/2016 | Roth | G06F 21/53 |
| 9,491,111 B1 * | 11/2016 | Roth | H04L 47/70 |
| 9,729,534 B2 | 8/2017 | Zhang et al. | |
| 2013/0055335 A1 * | 2/2013 | Chien | G06F 21/572 726/1 |

(Continued)

OTHER PUBLICATIONS

Stephen J. Bigelow. "Definition: Workload." TechTarget Data Center Definitions [online]. Dec. 2020, [retrieved on Oct. 1, 2023] <URL: https://www.techtarget.com/searchdatacenter/definition/workload> (Year: 2020).*

(Continued)

*Primary Examiner* — Chau Le
*Assistant Examiner* — Zhe Liu
(74) *Attorney, Agent, or Firm* — Hewlett Packard Enterprise Patent Department (57) ABSTRACT

Examples described herein relate to deferred authentication in secure boot systems. An untrusted component is identified in a boot sequence in a trusted execution environment. A secure boot authentication of the untrusted component is deferred for a predetermined period and access to hardware resources is restricted. An image digest and privilege rights including access to hardware resources associated with the untrusted component is obtained in an untrusted execution environment. A request including the image digest and the privilege rights is sent to a central node over a secure connection. A response including a signature based on image digest and approved privileges is received from the central node. The untrusted component is authenticated in the trusted execution environment using the signature before expiry of the predetermined period. Access to the hardware resources is provided to the untrusted component in the trusted execution environment based on the approved privileges.

20 Claims, 6 Drawing Sheets

(56) References Cited

U.S. PATENT DOCUMENTS

| | | | |
|---|---|---|---|
| 2014/0053245 A1* | 2/2014 | Tosa | H04L 63/08 |
| | | | 726/4 |
| 2014/0205092 A1* | 7/2014 | Hartley | H04L 9/0877 |
| | | | 380/44 |
| 2015/0169867 A1* | 6/2015 | Scaife | G06F 21/564 |
| | | | 726/4 |
| 2015/0254674 A1 | 9/2015 | Hall | |
| 2017/0041794 A1* | 2/2017 | Lee | H04W 12/08 |
| 2017/0093852 A1* | 3/2017 | Khosravi | H04L 63/0876 |
| 2017/0353313 A1* | 12/2017 | Goldman | G06F 21/44 |
| 2018/0129525 A1* | 5/2018 | Hong | G06F 21/53 |
| 2018/0262344 A1* | 9/2018 | Broumas | H04L 9/30 |
| 2019/0045016 A1* | 2/2019 | Dewan | H04L 63/0435 |
| 2020/0019695 A1* | 1/2020 | Sovio | G06F 21/602 |
| 2020/0364354 A1* | 11/2020 | Schwartz | H04L 9/3268 |
| 2021/0012855 A1 | 1/2021 | Menon et al. | |
| 2022/0066762 A1* | 3/2022 | Chen | G06F 8/61 |
| 2022/0121750 A1* | 4/2022 | Lee | G06F 9/4401 |
| 2022/0129559 A1* | 4/2022 | Duval | G06F 21/575 |

OTHER PUBLICATIONS

Kumar, S., "Hardware Security: Hardware Trojan Detection, Test and Debug Security Infrastructure IP," 2020, http://ethesis.nitrkl.ac.in/10161/.

* cited by examiner

DEFERRED AUTHENTICATION IN A SECURE BOOT SYSTEM

BACKGROUND

Secure boot is a security standard designed to ensure that a system boots using a trusted software. When a secure boot-enabled system is powered on, a firmware verifies whether system images including bootloaders, kernels, drivers, etc., are signed with a valid cryptographic key. If the signature associated with any of the images are invalid, then the central processing unit halts and the booting process is aborted. Therefore, the secure boot-enabled systems are protected from loading and executing unauthorized or malicious software.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. It will also be understood that, although the terms first, second, third, fourth, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

When a computer system is powered on, a firmware initiates a booting process. The firmware may include a specific set of instructions stored in a non-volatile memory that initializes functions of hardware components and authenticates system images. The system images may include a boot software or boot components, such as a bootloader and an operating system. A bootloader may include instructions that are loaded into a main memory and interfaces the hardware components and the operating system.

Generally, the system images in a secure boot system are signed using private keys owned by an Original Equipment Manufacturer (OEM). The OEM may manufacture and sell the secure boot system and/or its components. To secure the system, an authentication method is used that extends from a bootloader to user space. For instance, a firmware may verify whether a bootloader is signed by the OEM. The bootloader may in turn verify whether an operating system kernel is signed by the OEM and the kernel may then verify or mount a signed root filesystem (RFS). This establishes a chain of trust in the system images in the secure boot process. The chain of trust may break if any component of the system images fails the authentication.

Further, a manufacturing entity may buy the secure boot system and/or its components from the OEM and sell it to customers or end users. In some instances, the customer or end user of the secure boot system may encounter issues, such as hardware issues, in the system. The system may be returned to the manufacturing entity for diagnosing the issue as part of a return manufacturer authorization (RMA) process. The manufacturing entity may use a customized or proprietary testing software for diagnosing and troubleshooting the hardware issues. However, the customized or proprietary software is not signed by the OEM, and therefore, may not be authenticated during the secure boot process. As a result, the chain of trust is not be established, thereby halting the CPU and the booting process. Therefore, the manufacturing entity is not able to perform hardware analysis or testing of the secure boot-enabled system.

To overcome the above technical challenges, the OEM may sign and ship a dedicated bootloader to the manufacturing entity. The dedicated bootloader may be used by the manufacturing entity for burning a new operating system. Subsequently, a hardware testing image or software may be installed and run on the new operating system for resolving the hardware issues. However, shipping the dedicated bootloader is not a secure method. For example, the OEM signature included in bootloader may be captured by a hacker or attacker. Moreover, the dedicated bootloader may grant unlimited privileges, which may be misused by the manufacturing entities for installing potentially harmful software in the system. Therefore, the security and safety offered by the secure boot may be compromised.

To that end, the examples described herein allow a manufacturing entity to install and authenticate a hardware testing image, which may not be originally signed by the OEM in the secure boot system. In accordance with aspects of the present disclosure, a deferred authentication in secure boot systems is presented. In some examples, an untrusted component may be identified in a boot sequence in a trusted execution environment, which allows execution and isolation of a trusted component. A secure boot authentication of the untrusted component may be deferred for a predetermined period and the untrusted component may be restricted from accessing hardware resources. An image digest and privilege rights associated with the untrusted component may be obtained in an untrusted execution environment, which may allow execution of the untrusted component and the trusted component. The privilege rights may include access to the hardware resources. A request including the image digest and the privilege rights may be sent to a central node over a secure connection. A response including a signature based on the image digest and approved privileges may be received from the central node. The signature and the approved privileges may be transferred from the untrusted execution environment to the trusted execution environment. The untrusted component may be authenticated in the trusted execution environment using the signature before expiry of the predetermined period. Access to the hardware resources may be provided to the untrusted component in the trusted execution environment based on the approved privileges.

As will be appreciated, examples presented herein facilitate enhanced authentication of boot components according to a deferred authentication operation in the trusted execution environment. The deferred authentication prevents a secure boot authentication of an untrusted component and provides limited hardware resources to the untrusted component for a fixed duration. Customized privilege requests may be made to the central node to provide flexibility of the hardware access requests for the untrusted components. The central node may grant or reject one or more hardware access requests, thereby controlling the degree of privileges provided as a response. Further, the signature requests and responses between the central node and the secure boot system is encrypted and therefore, is a safe and secure technique. Moreover, the examples presented herein provide a convenient approach for a manufacturing entity to replace OEM images with hardware testing image on the secure boot systems without sacrificing security.

Figure 1:
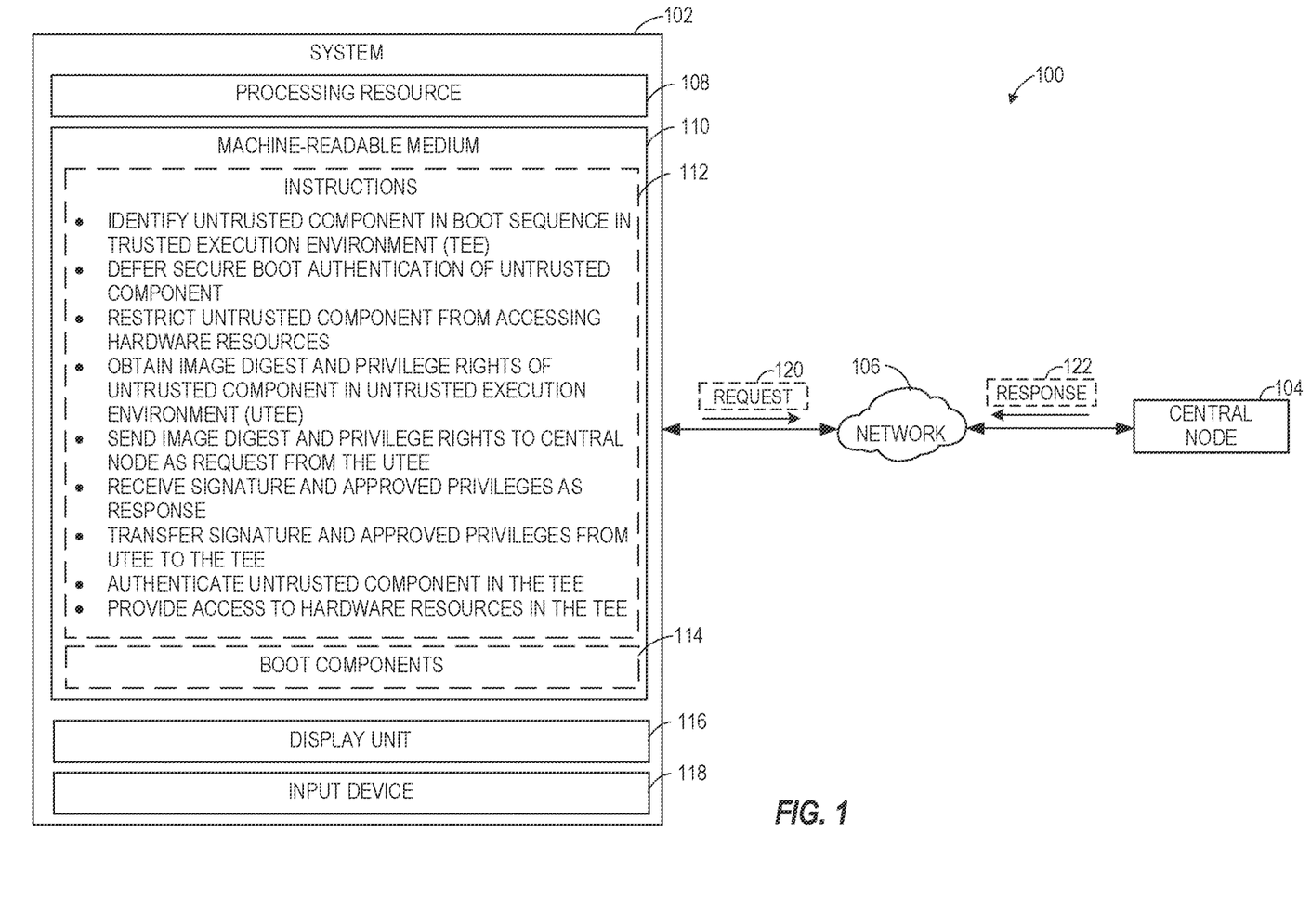
FIG. 1 depicts a networked system including a secure boot system facilitating deferred authentication of an untrusted boot component, in accordance with an example.

Referring now to the drawings, in FIG. 1, a networked system 100 is depicted, in accordance with an example. The networked system 100 may include a secure boot system 102 coupled to a central node 104 via a network 106. The secure boot system 102 may be a system or a device with compute and storage capabilities supporting a secure boot security standard. The central node 104 may be a centralized remote system capable of authorizing system images, which comply with the secure boot security standard. In some examples, the networked system 100 may be a distributed system where the secure boot system 102 and the central node 104 are located at physically different locations (e.g., on different racks, on different enclosures, in different buildings, in different cities, in different countries, and the like) while being connected via the network 106.

The network 106 may provide secure connections by implementing secure channel protocols including, but not limited to, IP security (IP Sec), Transport Layer Security (TLS), Secure Shell (SSH), Datagram Transport Layer Security (DTLS), Multi Path Virtual Private Network (MPVPN), WireGuard, and the like. In some examples, the network 106 may be enabled via private communication links including, but not limited to, communication links established via Virtual Private Network (VPN), Bluetooth, cellular communication, optical communication, radio frequency communication, wired (e.g., copper), and the like. In some examples, the private communication links may be direct communication links between the system 102 and the central node 104. Other examples of the network 106 may also include, but are not limited to, an Internet Protocol (IP) or non-IP-based local area network (LAN), wireless LAN (WLAN), metropolitan area network (MAN), wide area network (WAN), a storage area network (SAN), a personal area network (PAN), and the Internet. In some examples, the network 106 may include one or more network switches, routers, or network gateways to facilitate data communication. Communication over the network 106 may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network 106 may be enabled via a wired (e.g., copper, optical communication, etc.) or wireless (e.g., Wi-Fi®, cellular communication, satellite communication, Bluetooth, etc.) communication technologies.

In FIG. 1, although the networked system 100 is shown to include one secure boot system 102 and one central node 104, the networked system 100 may include any number of secure boot systems and central nodes, without limiting the scope of the present disclosure. The secure boot systems 102 may have similar or varying hardware and/or software configurations in a given implementation of the networked system 100. For explanation purposes, the secure boot system 102 may also be referred to as the system 102 or a processor-based system 102. The processor-based system may refer to any system including a processor or microcontroller and/or any other electronic component, or a device or system that may facilitate various compute and/or data storage services. Examples of the secure boot system 102 may include, but are not limited to, a desktop computer, a laptop, a smartphone, a server, a computer appliance, an access point, a switch, a router, a workstation, a storage system, or a converged or hyperconverged system, an appliance, an embedded computer appliance, Internet of Thing (IoT) devices, and the like.

In some examples, the system 102 may include a processing resource 108 and a machine-readable medium 110. The machine-readable medium 110 may be any electronic, magnetic, optical, or other physical storage device that may store data, executable instructions 112, and system images or boot components 114, such as bootloaders and operating systems. For example, the machine-readable medium 110 may include one or more of a Random Access Memory (RAM), an Electrically Erasable Programmable Read-Only Memory (EEPROM), a storage drive, a flash memory, a Compact Disc Read Only Memory (CD-ROM), and the like. The machine-readable medium 110 may be non-transitory. The boot components 114 may be stored in a non-volatile storage, such as Flash memory. As described in detail herein, the machine-readable medium 110 may be encoded with the executable instructions 112 to perform one or more methods, for example, methods described in FIG. 4.

Further, the processing resource 108 may be a physical device, for example, one or more central processing unit (CPU), one or more semiconductor-based microprocessors, one or more graphics processing unit (GPU), application-specific integrated circuit (ASIC), a field programmable gate array (FPGA), other hardware devices capable of retrieving and executing instructions 112 stored in the machine-readable medium 110, or combinations thereof. The processing resource 108 may fetch, decode, and execute the instructions 112 stored in the machine-readable medium 110 to perform deferred authentication in secure boot systems (described further below). As an alternative or in addition to executing the instructions 112, the processing resource 108 may include at least one integrated circuit (IC), control logic, electronic circuits, or combinations thereof that include a number of electronic components for performing the functionalities intended to be performed by the system 102.

In some examples, the secure boot system 102 may include two or more independent execution environments. For instance, the secure boot system 102 may include a first independent execution environment, namely a trusted execution environment, and a second independent execution environment, namely a normal or untrusted execution environment. In some examples, an untrusted component may be installed in the trusted execution environment of the secure boot system 102. The untrusted component may be a boot component which may not be appended with a valid signature of the OEM. The boot components or system images, such as bootloaders, kernels, operating systems, in the trusted execution environment may be protected from components external to the trusted execution environment (described further in detail with respect to FIG. 3).

In some examples, the secure boot system 102 may include a display unit 116 and an input device 118. The display unit 116 may be a Light Emitting Diode (LED) display, an organic light-emitting diode (OLED), microLED display (mLED), active-matrix organic light-emitting diode (AMOLED), quantum dot display, or a Liquid Crystal Display (LCD), a transflective liquid-crystal display, a Thin-Film Transistor flat-panel display (FPD), a plasma display (PDP), Electroluminescent (ELD) display, color graphics adapter (CGA) display, enhanced graphics adapter (EGA) display, variable-graphics-array (VGA) display, super VGA display, cathode ray tube (CRT), and the like. The input device 118 may be a touch screen that is positioned over the display unit 116. The touch screen may be integrated with the display unit 116 or, alternatively, the touch screen may be a separate component. In some examples, the input device 118 may also correspond to keyboards, mouse, cameras, microphones, speakers, printers, scanners, and/or the like. The input device 118 may be integrated with the system 102 or they may be peripheral components. In some cases, the input device 118 may be connected to the system 102 through wired connections (e.g., cables/ports). In other cases, the input device 118 may be connected to the system 102 through wireless connections.

Figure 2A:
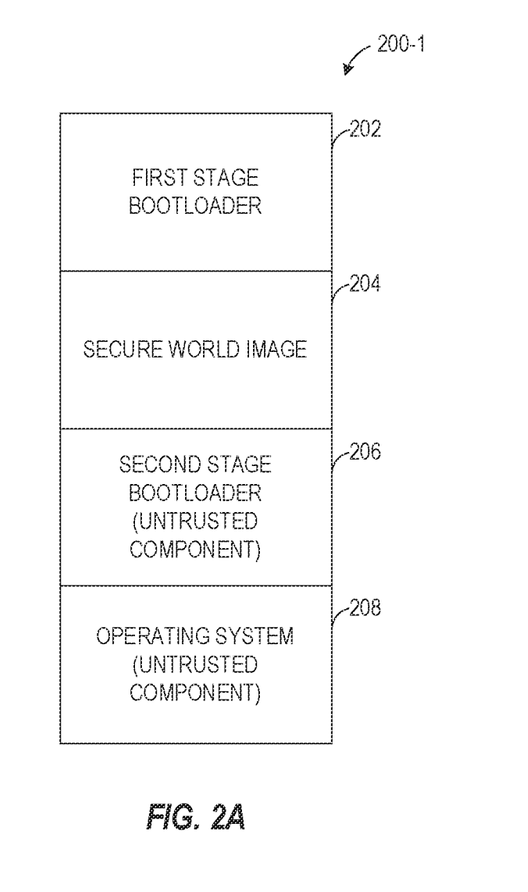
FIGS. 2A and 2B depict a storage view of the boot sequence in the secure boot system, in accordance with an example.
Figure 2B:
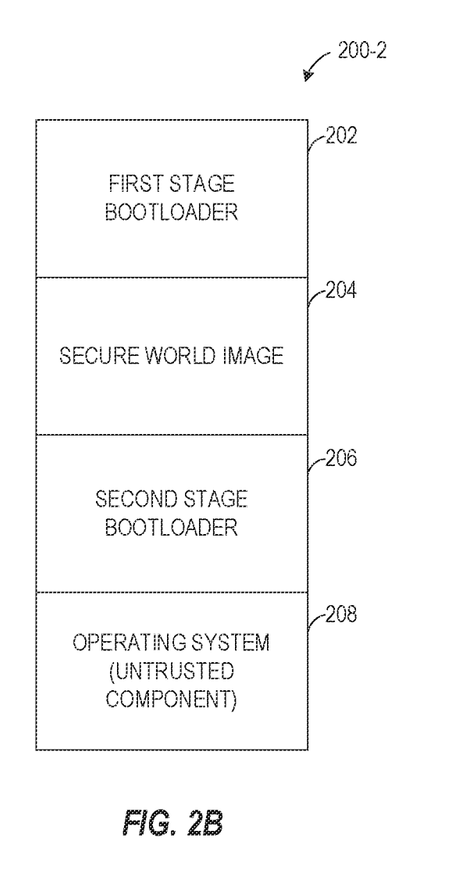

During operation, the processing resource 108 may identify one or more untrusted components in a boot sequence in a trusted execution environment during a boot up process. Each component in a boot sequence may include a flag value linked to a signature appended to the component. The flag value may indicate whether the signature is valid (i.e., signed by OEM) or invalid (i.e., not signed by OEM). The processing resource 108 may use the flag value to confirm whether the boot component is a trusted component or an untrusted component before authenticating the boot component. FIGS. 2A and 2B depict a storage view of the boot sequence in the secure boot system 102, in accordance with an example. The boot sequence 200 may include a first stage bootloader 202, secure world image 204, second stage bootloader 206, and operating system 208. The bootloaders may be stored in a non-volatile storage media, such as a Flash memory. In some examples, the boot sequence 200 may include a plurality of boot components including, but not limited to, system images, one or more bootloaders, one or more operating systems, one or more kernels, one or more drivers, and the like. The bootloader may include instructions that are loaded into a main memory of the system on startup. The bootloader may include instructions that facilitate interfacing of the hardware components and the operating system. Examples of bootloaders may include, but not limited to, NT Loader (NTLDR), Boot Manager (BOOTMGR), GRand Unified Bootloader (GRUB), GRUB 2, Syslinux, BootX, and the like. Operating systems may be a system software for managing hardware and software resources and providing services to applications. Examples of operating systems may include Windows, Android, Chrome OS, Mac OS, iOS, and the like. A kernel may be the core set of instructions in the operating system. Examples of kernels may include monolithic kernels, microkernels, hybrid kernels, nanokernels, exokernels, etc. Further, the driver may be an intermediary between operating systems and hardware devices or components of the system.

Although the boot sequence 200 is shown to include two bootloaders and an operating system, the boot sequence 200 may include any number of bootloaders, operating systems, and other images, without limiting the scope of the present disclosure. When the secure boot system 102 is powered on, a system firmware (not shown in the figure) may be launched. The system firmware may authenticate the various system images including the bootloaders, operating systems, etc., according to a secure boot authentication process. In some examples, the secure boot authentication may be performed using cryptographic keys issued by an Original Equipment Manufacturer (OEM). The secure boot authentication and execution of the first stage bootloader 202 may be initiated in the boot sequence. Upon successful authentication, the first stage bootloader 202 may attempt to perform the secure boot authentication of the secure world image 204. In some examples, one or more untrusted components 206 may be included in the boot sequence in the trusted execution environment. For example, the untrusted components may include the second stage bootloader 206 and an operating system 208 in the boot sequence 200-1 as shown in FIG. 2A. In another example, the untrusted component may include the operating system 208 in the boot sequence 200-2, as shown in FIG. 2B. The untrusted component may be included in the boot sequence by a manufacturing entity for performing hardware analysis or testing on the secure boot system 102.

Referring back to FIG. 1, in response to identification of the untrusted component in the boot sequence, the processing resource 108 may defer a secure boot authentication of the untrusted component and restrict access to hardware resources to the untrusted component. In some examples, restricting may include disallowing loading of the untrusted component in a memory, such as the main memory or Random Access Memory (RAM), or executing one or more instructions in the untrusted component using the processing resource 108. In some examples, restricting may include disallowing read/write operations to one or more components in the machine readable medium 110. Further, the processing resource 108 may obtain an image digest and privilege rights associated with the untrusted component in an untrusted execution environment. The image digest may be an alphanumeric output of a cryptographic operation, such as hashing, performed on the untrusted component. In some examples, the image digest may be obtained by hashing the untrusted bootloader using a hashing function. The privilege rights may include access to one or more hardware resources for executing the untrusted component. In some examples, the privilege rights may be displayed as one or more options on the display unit 116 for user selection. The one or more options may include hardware resources and validity period. A user may select the hardware resources and validity period for execution of the untrusted component using the input device 118.

The processing resource 108 may send a request 120 including the image digest and the privilege rights to the central node 104 over a secure connection. The processing resource 108 may receive a response 122 including approved privileges and a signature based on the image digest from the central node 104 and may transfer the response 122 from the untrusted execution environment to the trusted execution environment. The processing resource 108 may authenticate the untrusted component using the signature before expiry of the predetermined period. Upon successful authentication, access to the hardware resources may be provided to the untrusted component in the trusted execution environment based on the approved privileges.

Figure 3:
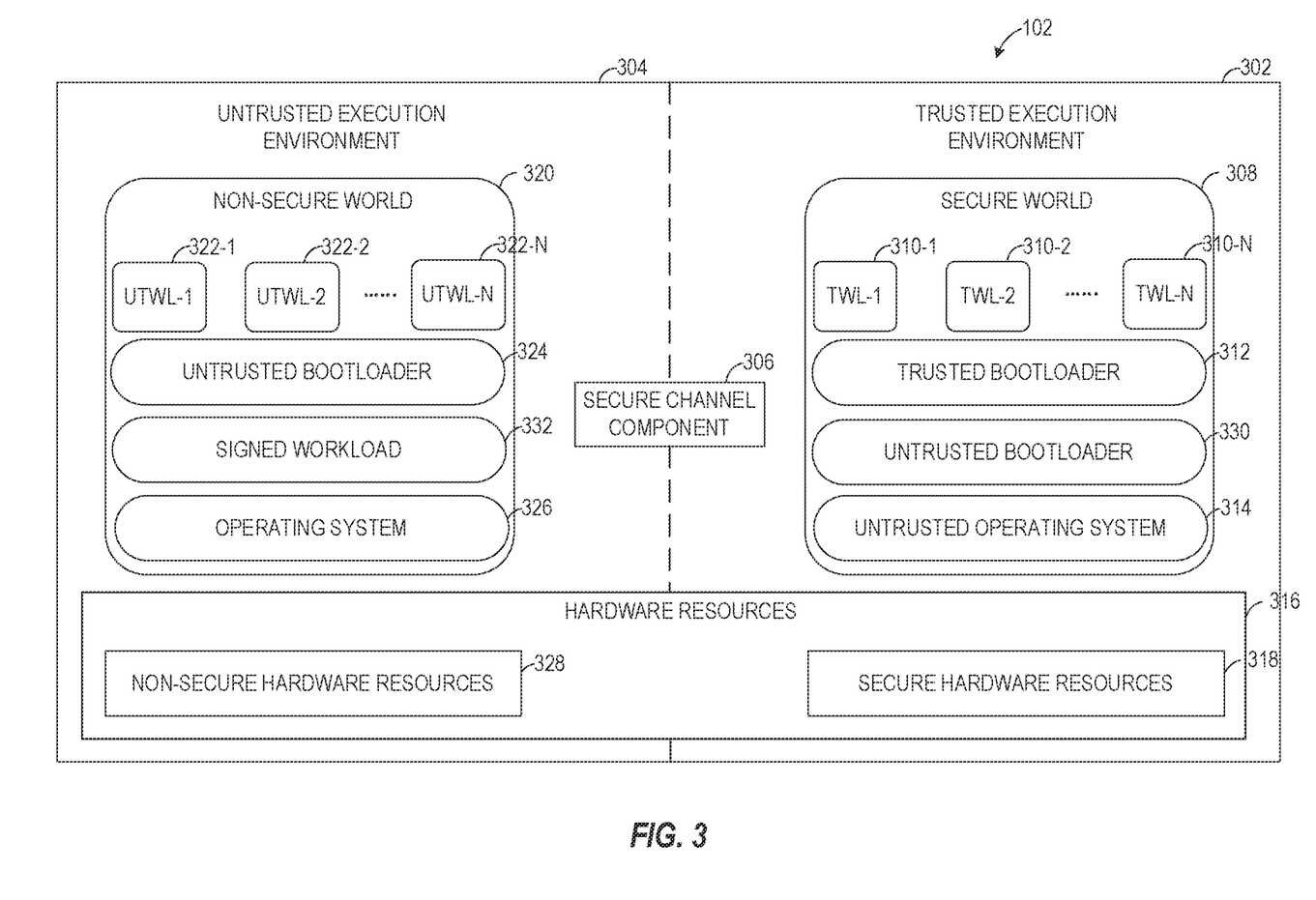
FIG. 3 depicts a secure boot system facilitating deferred authentication of an untrusted boot component, in accordance with an example.

FIG. 3 depicts a secure boot system 102 facilitating deferred authentication of untrusted boot component, in accordance with an example. The system 102 may include a trusted execution environment 302, an untrusted execution environment 304, and a secure channel component 306. The term "execution environment" may collectively refer to a set of hardware components and system image components, such as system-level machine-executable instructions, embedded machine-executable instructions, firmware, other machine-executable instructions, etc., facilitating execution of workloads. The trusted execution environment 302 may include secure world 308, which may include trusted workloads 310-N (labeled as TWL-1, TWL-2, . . . , TWL-N), one or more trusted bootloaders 312, and one or more operating systems 314. The trusted workloads 310-N and bootloaders 312 may be isolated from inspection and modification from components external to the trusted execution environment 302. Each component in the trusted execution environment 302, i.e., the secure world 308 may be protected from malware attacks from outside the trusted execution environment 302. The trusted execution environment 302 may allow isolated execution of trusted components or signed boot components. Further, trusted workloads 310-N, bootloaders 312, and operating system 314 within the trusted execution environment 302 may be trusted with respect to authenticity and integrity.

Further, the secure boot system 102 may include hardware resources 316 including, but not limited, a chipset, one or more integrated circuits, to one or more processing resources, one or more memory units, one or more storage components, and the like. One or more hardware resources 316 may be used exclusively by the trusted execution environment 302 and therefore facilitate protection from unauthorized tracing and control through debug and test methods. For example, the secure hardware resources 318 may be used exclusively by the components of the trusted execution environment 302. Examples of trusted hardware resources include a secure element, a cryptographic key, a secure storage, a hardware security module, a processor, memory, a controller, a crypto accelerator, etc. In some examples, the trusted execution environment 302 may control access to the secure hardware resources 318 by components external to the trusted execution environment 302. In some examples, the secure world 308 may be capable of accessing the complete hardware resources 316.

The untrusted execution environment 304, hereinafter also referred to as rich execution environment or normal execution environment, may include non-secure world 320. The non-secure world 320 may facilitate execution of untrusted or normal workloads 322 (labeled as UTWL-1, UTWL-2, . . . , UTWL-N), untrusted or normal bootloader 324, and untrusted or normal operating system 326. In some examples, the untrusted execution environments 304 may allow execution of the one or more untrusted components and the one or more trusted components. Examples of a rich or normal operating system may include a Linux operating system, a Windows operating system, an Android operating system, etc. Although the execution environments are shown to include an example number of workloads, bootloaders, and operating system, the trusted and untrusted execution environments may include any number of workloads, bootloaders, and operating systems, without limiting the scope of the present disclosure. Further, the hardware resources 316 may also include non-secure hardware resources 328. In some examples, the untrusted workloads 322-N may exclusively access the non-secure hardware resources 328. In some examples, the hardware resources 316 may be accessed by the trusted workloads 310-N to full capacity.

The secure channel component 306 may provide a secure communications channel between the trusted execution environment 302 and untrusted execution environment 304 when executed by the processing resource. The secure channel component 306 may include one or more instructions to encrypt data and transfer the encrypted data to the trusted execution environment 302. In some examples, the secure channel component 306 may switch between a secure mode and a non-secure mode. The secure channel component 306 may save and restore processor state of the trusted execution environment 302 and the untrusted execution environments 304 based on the mode of operation.

The secure channel component 306 may establish the secure communications in response to a request. In some examples, the secure channel component 306 may include one or more instructions to establish a secure communication in response to a request by a workload or an operating system in the untrusted or trusted execution environment. The secure channel component 306 may check whether the request includes a predetermined signature. The predetermined signature may be a signature issued by an OEM. Further, the secure communications channel may be based on kernel-mode drivers, one of which initiates a secure mode. The secure channel component 306 when executed by the processing resource may establish the secure communications channel based on libraries or modules at a language runtime level of the trusted execution environment 302 and the untrusted execution environments 304.

In some examples, an untrusted component 330 may be installed in the trusted execution environment of the secure boot system 102. The operating system 314 may be replaced with another operating system, which may also be an unsigned or untrusted operating system. When the secure boot system 102 is restarted, the system 102 may detect the untrusted component 330 in the boot sequence in the trusted execution environment 302. In response to the detection of the untrusted component, a deferred authentication mode is initiated in the trusted execution environment 302. In the deferred authentication mode, the secure boot authentication may be deferred for a predetermined period. The predetermined period may be initiated by a timer circuit (not shown in the figure). In some examples, the predetermined period may be 24 hours or 48 hours or more. Additionally, the untrusted component 330 may also have restricted access to the hardware resources 316.

In some examples, the non-secure world 320 may include a signed workload 332, which may include a verified signature. For example, the verified signature may be provided by the OEM. The signed workload 332 may communicate with the trusted execution environment 302 if the verified signature matches with the signature of the secure world 308 in the trusted execution environment 302.

Further, in the deferred authentication mode, the signed workload 332 may obtain an image digest of the untrusted component 330 and privilege rights. In some examples, the signed workload 332 may also obtain system related data, for example, hardware serial number, system model, system certificate. In some examples, the image digest of the untrusted component 330 may be generated using a hashing function. The hash functions may include unkeyed cryptographic hash functions, keyed cryptographic hash functions, non-cryptographic hash functions, universal hash function families, etc. Examples of hash functions may include MD5 (message digest), tabulation hashing, Pearson hashing, SHA functions (Secure Hash Algorithm), such as SHA-1, SHA-224, SHA-256, SHA-382, SHA-512, Rabin fingerprint, Zobrist hashing, and the like.

The privilege rights may include requests to access hardware resources for the untrusted component 330. In some examples, the secure boot system may provide a user interface displayed on the display unit. The user interface may render options of the hardware resources for user selection on the display unit. In some examples, the hardware resources may include access to storage, input output bus, radio resources, ethernet LAN port, and a validity period. The options for a storage access may include NOR Flash, NAND Flash, embedded multimedia card (eMMC). For input output bus may include general purpose input output bus (GPIO), serial peripheral interface (SPI), universal serial bus (USB), peripheral component interconnect (PCI). Similarly, the options for radio resource may include 2.4G, 5G, 6G, Wi-Fi radio, Bluetooth Low Energy (BLE) radio, Zigbee radio and the like. A user may select the necessary hardware resources which may be essential for executing the untrusted component 330 in the trusted execution environment 302. The user may also select the validity period for storing the untrusted component 330 in non-volatile storage in the trusted execution environment 302.

Further, the signed workload 332 may send a request to the central node 104 over a secure encrypted connection. The request may include at least the image digest of the untrusted component 330 and privilege rights including the hardware access requests and the validity period provided by the user. The signed workload 332 may receive a response including the approved privileges and signature based on the image digest from the central node 104. The signed workload 332 may transfer the signature and the approved privileges from the untrusted execution environment 304 to the trusted execution environment 302 through the secure channel component 306. The untrusted component 330 may be authenticated in the trusted execution environment 302 using the signature before expiry of the predetermined period. Upon successful authentication, the untrusted component 330 may be provided access to the hardware resources in the trusted execution environment 302 based on approved privileges. In some examples, the untrusted component may perform hardware analysis or testing after the successful authentication.

Figure 4:
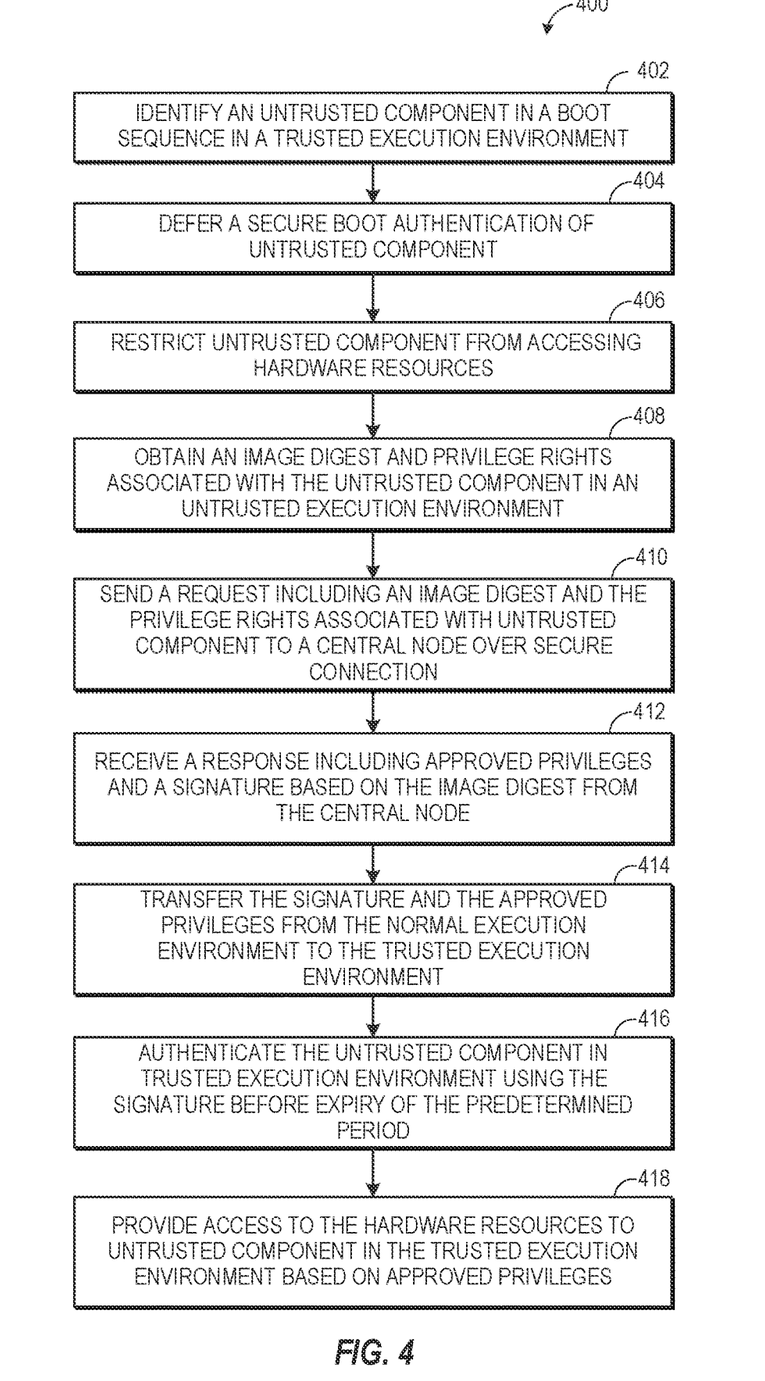
FIG. 4 is a flow diagram depicting a method for deferred authentication in a secure boot system, in accordance with an example.

Moving now to FIG. 4, a flow diagram depicting a method 400 for a deferred authentication in a secure boot system is presented, in accordance with an example. For illustration purposes, the method 400 is described in conjunction with the networked system 100 of FIG. 1, but the method 400 should not be construed to be limited to the example configuration of system 100. The method 400 may include method blocks 402, 404, 406, 408, 410, 412, 414, 416, and 418 (hereinafter collectively referred to as blocks 402-418) which may be performed by a processor-based system such as, for example, the system 102. In particular, operations at each of the method blocks 402-418 may be performed by the processing resource 108 by executing the instructions 112 stored in the machine-readable medium 110 (see FIG. 1). In some other examples, the order of execution of the blocks 402-418 may be different than the order shown in FIG. 4. For example, the blocks 402-418 may be performed in series, in parallel, or a series-parallel combination. Also, certain details of the operations performed by the processing resource 108 that are already described in FIG. 1 are not repeated herein for the sake of brevity.

At block 402, the processing resource 108 may identify one or more untrusted components in a boot sequence in the trusted execution environment 302, which may allow execution and isolation of one or more trusted components. At block 404, the processing resource 108 may defer a secure boot authentication of the one or more untrusted components. At block 406, the processing resource 108 may restrict access to hardware resources to the one or more untrusted components. At block 408, the processing resource 108 may obtain an image digest and privilege rights associated with the one or more untrusted components in an untrusted execution environment. The untrusted execution environment allows execution of the one or more untrusted components and the one or more trusted components.

At block 410, the processing resource 108 may send a request including an image digest and the privilege rights to a central node over secure connection. At block 412, the processing resource 108 may receive a response including approved privileges and a signature based on the image digest from the central node 104. At block 414, the processing resource 108 may transfer the signature and the approved privileges from the untrusted execution environment to the trusted execution environment. At block 416, the processing resource 108 may authenticate the one or more untrusted components in trusted execution environment using the signature before expiry of the predetermined period. At block 418, the processing resource may provide the access to the hardware resources to the one or more untrusted components in the trusted execution environment based on approved privileges. In some examples, the one or more untrusted components may analyze a defect based on the approved privileges.

Figure 5:
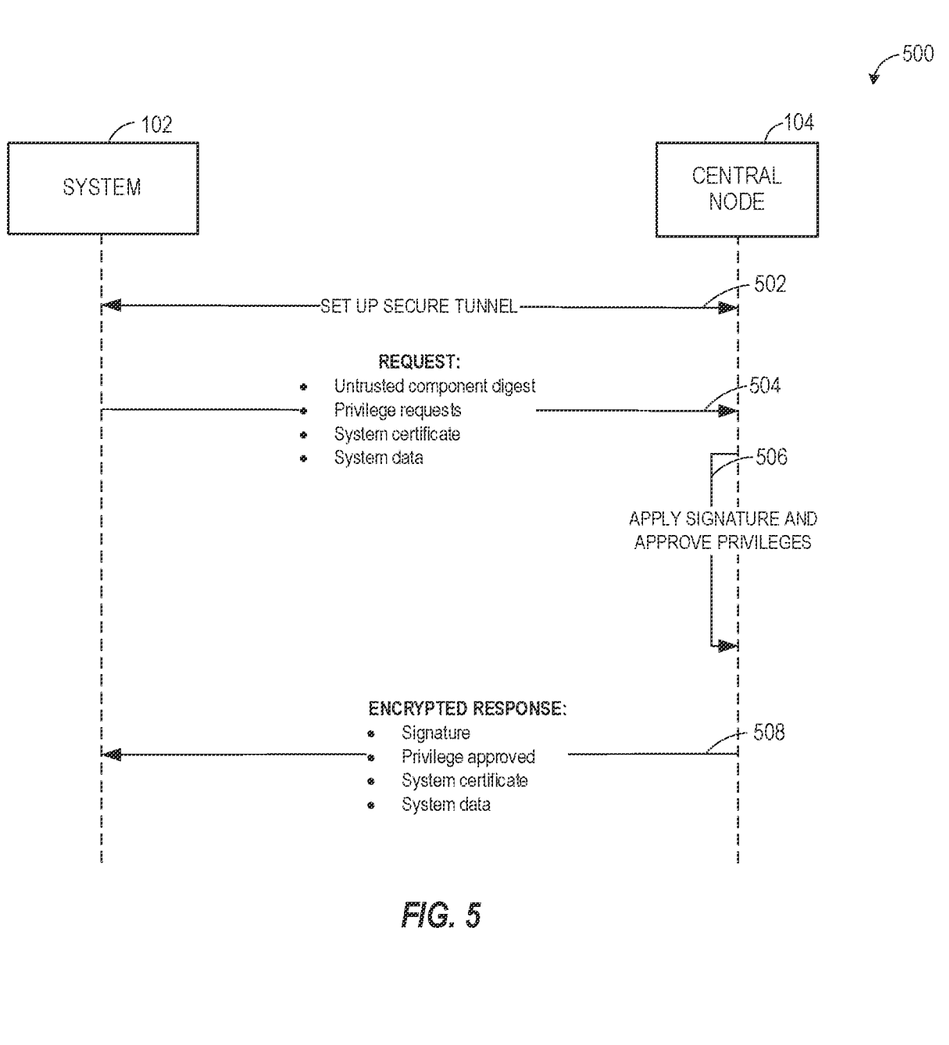
FIG. 5 is a signal diagram depicting a method for authenticating untrusted boot component in a secure boot system, in accordance with another example.

FIG. 5 is a signal diagram 500 depicting a method for authenticating untrusted component 330 in a secure boot system 102, in accordance with an example. At 502, the system 102 may establish a secure tunnel with the central node 104 by implementing using secure channel protocols including, but not limited to, IP security (IP Sec), Transport Layer Security (TLS), Secure Shell (SSH), Datagram Transport Layer Security (DTLS), Multi Path Virtual Private Network (MPVPN), WireGuard, and the like.

At 504, the system 102 may send a request to the central node 104 that may include a signature request and a privilege request. In some examples, the signature request may include the image digest associated with untrusted component, system certificate, and system data. The privilege request may include request for hardware resources and a validity period. For example, the privilege request may include access to storage, input output bus, radio resources, ethernet LAN port, and a validity period. In some examples, the system certificate may include a public key associated with the system 102. The system data may include identity of the system that may be used by the central node 104 for verification purposes. For example, the system data may include system model, hardware serial number, a physical address, such as media access control (MAC) address, etc., which may uniquely identify the system.

On receiving the request, the central node 104 may check the identity of the system based on the system model and hardware serial number. For example, an OEM operator may check the request received at the central node 104 and decide whether the system model and hardware serial number are valid or genuine. At 506, the image digest may be signed with a private key. The private key may be a cryptographic key owned and securely used by the OEM. In some examples, signing the image digest with a private key may create a signature. In some examples, the signature may be created using the private key and the system data.

At 506, the central node 104 may also approve the privilege requests by approving the access to one or more hardware resources included in the privilege request. In some examples, the OEM operator may check the privilege rights requested. For instance, the system 102 may have requested for a storage access including NOR Flash, NAND Flash, and embedded multimedia card (eMMC), and radio resources including (2.4G, 5G, Bluetooth Low Energy (BLE)), and also for validity period of 7 days. The OEM operator may check the hardware access requested and the validity period before deciding whether to approve the privilege rights. For example, the OEM operator may not approve the untrusted component to run on the system 102 for 7 days. In such a scenario, the privilege rights may be rejected and sent back to the system 102 as a response. The untrusted component may not be able to access the hardware resources due to rejection of the privilege rights. In another example, the OEM operator may approve the untrusted component to run on the system 102 for 7 days. In that case, the privilege rights may be approved and sent back to the system 102 as a response.

In some examples, the central node 104 may encrypt the response using the system certificate, which may include a public key associated with the system 102. At 508, the encrypted response may be sent to the system 102. The system 102 may receive and decrypt the encrypted response using a private key, which may be stored safely in the system 102. The private key may correspond to the public key obtained from the system certificate. On decrypting the response, the signature, the approved privileges, and the system data may be obtained. The system 102 may authenticate the untrusted component using the received signature. For instance, the system 102 may verify the signature using a public key associated with the central node. The system may obtain a hash by performing a cryptographic operation of the signature and the public key. The system may check whether the obtained hash is the same as the untrusted component image digest. Further, the system may also verify the system identifier obtained from the decrypted response is identical to the system identifier. In some examples, if the verification is unsuccessful, the CPU may halt, and the system may not boot up.

In some examples, the system 102 may store the signature and other data obtained from the decrypted response in a non-volatile storage. In some examples, the signature and the data may be stored as a cache. In subsequent boot up process of the system 102, the signature may be directly retrieved from the cache instead of connecting with the central node 104 to obtain the signature. In some examples, the validity period may be checked before performing the authentication. If the validity period has expired, then the system may erase the untrusted component from the non-volatile storage.

Figure 6:
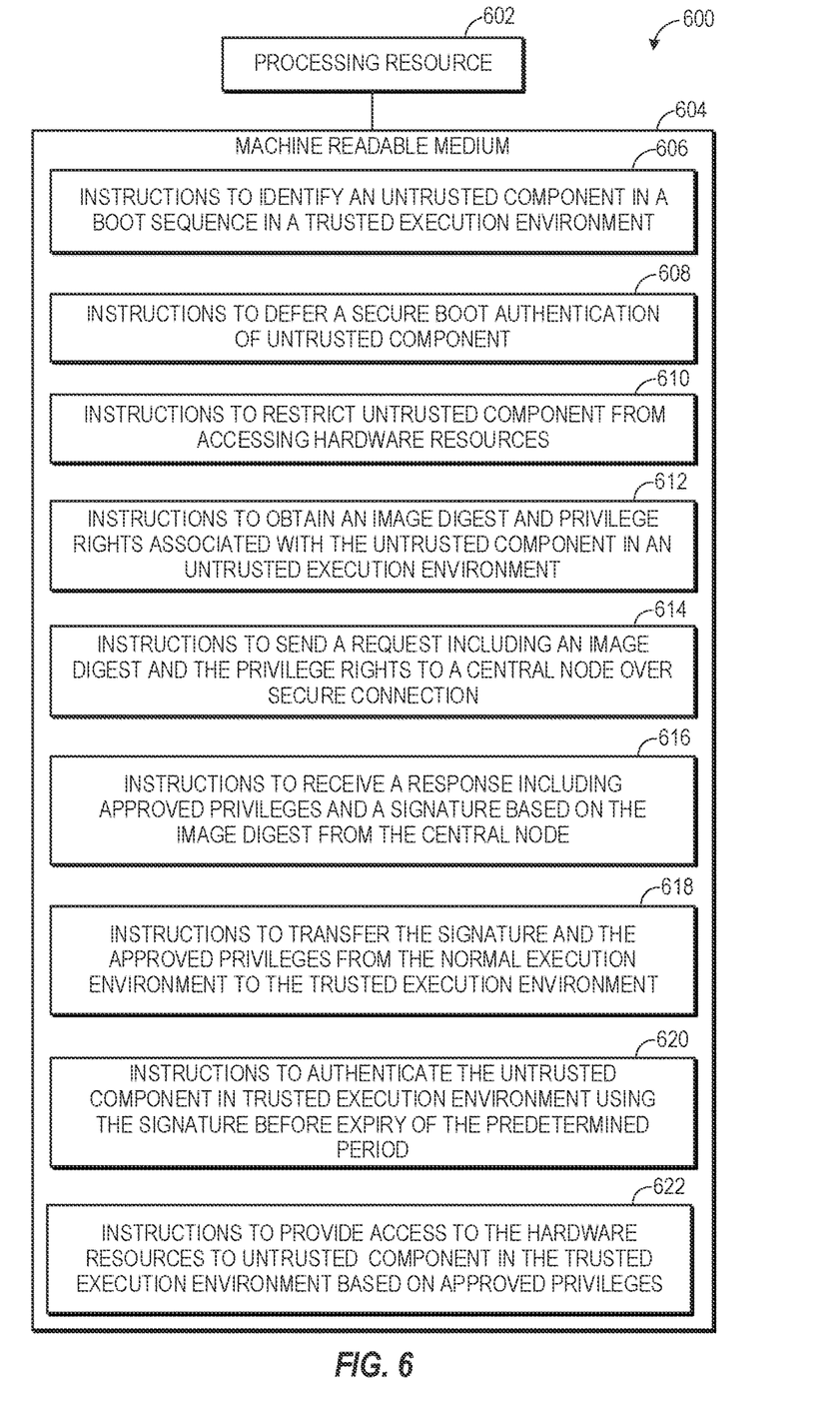
FIG. 6 is a block diagram depicting a processing resource and a machine-readable medium encoded with example instructions to authenticate untrusted boot component in a secure boot system, in accordance with an example.

Moving to FIG. 6, a block diagram 600 depicting a processing resource 602 and a machine-readable medium 604 encoded with example instructions to facilitate deferred authentication in a secure boot system is presented, in accordance with an example. The machine-readable medium 604 may be non-transitory and is alternatively referred to as a non-transitory machine-readable medium 604. As described in detail herein, the machine-readable medium 604 may be encoded with executable instructions 606, 608, 610, 612, 614, 616, 618, 620 and 622 (hereinafter collectively referred to as instructions 606-622) for performing the method 400 described in FIG. 4. Although not shown, in some examples, the machine-readable medium 604 may be encoded with certain additional executable instructions to perform the method 400 of FIG. 4, and/or any other operations performed by the system 102, without limiting the scope of the present disclosure. In some examples, the machine-readable medium 604 may be accessed by the processing resource 602. In some examples, the processing resource 602 may represent one example of the processing resource 108 of the system 102. Further, the machine-readable medium 604 may represent one example of the machine-readable medium 110 of the system 102. In some examples, the processing resource 602 may fetch, decode, and execute the instructions 606-622 stored in the machine-readable medium 604 to perform a deferred authentication of untrusted components in the secure boot system.

The instructions 606 when executed by the processing resource 602 may cause the processing resource 602 to identify one or more untrusted components in a boot sequence in a trusted execution environment. Further, the instructions 608 when executed by the processing resource 602 may cause the processing resource 602 to defer a secure boot authentication of the one or more untrusted components. Furthermore, the instructions 610 when executed by the processing resource 602 may cause the processing resource 602 to restrict the one or more untrusted components from accessing hardware resources. Moreover, the instructions 612 when executed by the processing resource 602 may cause the processing resource 602 to obtain an image digest and privilege rights associated with the one or more untrusted components in an untrusted execution environment. The instructions 614 when executed by the processing resource 602 may cause the processing resource 602 to send a request including an image digest and the privilege rights to a central node over secure connection. Further, the instructions 616 when executed by the processing resource 602 may cause the processing resource 602 to receive a response including approved privileges and a signature based on the image digest from the central node. The instructions 618 when executed by the processing resource 602 may cause the processing resource 602 to transfer the signature and the approved privileges from the untrusted execution environment to the trusted execution environment. The instructions 620 when executed by the processing resource 602 may cause the processing resource 602 to authenticate the one or more untrusted components in trusted execution environment using the signature before expiry of the predetermined period. Further, the instructions 622 when executed by the processing resource 602 may cause the processing resource 622 to provide access to the hardware resources to the one or more untrusted components in the trusted execution environment based on approved privileges.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
    identifying, by a processor-based system, an untrusted component in a boot sequence in a trusted execution environment, wherein the trusted execution environment allows execution and isolation of a trusted component, and the untrusted component is installed in the trusted execution environment;
    deferring, by the processor-based system, a secure boot authentication of the untrusted component for a predetermined period;
    restricting, by the processor-based system, the untrusted component from accessing hardware resources;
    obtaining, by a workload in an untrusted execution environment of the processor-based system, an image digest and privilege rights associated with the untrusted component in the trusted execution environment, wherein the image digest is produced by a cryptographic operation applied on the untrusted component in the trusted execution environment, the privilege rights include access to the hardware resources, and the untrusted execution environment is separate from the trusted execution environment and connected to the trusted execution environment by a secure communications channel;
    sending, by the workload, a request including the image digest and the privilege rights to a central node over a secure connection;
    receiving, by the workload, a response including approved privileges and a signature based on the image digest from the central node;
    transferring, by the workload, the signature and the approved privileges from the untrusted execution environment to the trusted execution environment;
    authenticating, by the processor-based system, the untrusted component in the trusted execution environment using the signature before expiry of the predetermined period; and
    providing, by the processor-based system, access to the hardware resources to the untrusted component while the untrusted component is being executed in the trusted execution environment based on the approved privileges.

2. The method of claim 1, wherein the untrusted component is not appended with a valid signature.

3. The method of claim 1, wherein the untrusted component comprises one or more of a bootloader, an operating system, a kernel, a driver, or a master boot record included in the boot sequence for performing one of hardware analysis or testing of the processor-based system.

4. The method of claim 1, wherein the privilege rights comprise one or more of access to storage, access to an input-output bus, access to a radio resource, or access to an ethernet LAN port.

5. The method of claim 1, wherein the workload in the untrusted execution environment is a signed workload with a verified signature.

6. The method of claim 1, wherein the authenticating of the untrusted component comprises verifying, by the processor-based system, the signature using a public key associated with the untrusted component.

7. The method of claim 1, further comprising:
    analyzing, by testing software in the processor-based system, a defect using the untrusted component based on the approved privileges.

8. The method of claim 1, wherein the boot sequence comprises a plurality of components to perform a boot process of the boot sequence, the plurality of components comprising the untrusted component, and the method comprising:
    associating a first flag with the untrusted component, the first flag set to a first value indicating that the untrusted component is untrusted; and
    associating a second flag with a further component of the plurality of components, the second flag set to a second value indicating that the further component is trusted.

9. A system comprising:
    a hardware processing resource;
    a non-transitory machine-readable medium storing instructions that, when executed by the hardware processing resource, cause the hardware processing resource to:
        identify an untrusted component in a boot sequence in a trusted execution environment, wherein the trusted execution environment allows execution and isolation of a trusted component, and the untrusted component is installed in the trusted execution environment;
        defer a secure boot authentication of the untrusted component for a predetermined period;
        restrict the untrusted component from accessing hardware resources;
        obtain, at a workload in an untrusted execution environment of the system, an image digest and privilege rights associated with the untrusted component in the trusted execution environment, wherein the image digest is produced by a cryptographic operation applied on the untrusted component in the trusted execution environment, the privilege rights include access to the hardware resources, and the untrusted execution environment is separate from the trusted execution environment and connected to the trusted execution environment by a secure communications channel;
        send, from the workload, a request including the image digest and the privilege rights to a central node over a secure connection;
        receive, at the workload, a response including approved privileges and a signature based on the image digest from the central node;

transfer the signature and the approved privileges from the workload in the untrusted execution environment to the trusted execution environment;

authenticate the untrusted component in the trusted execution environment using the signature before expiry of the predetermined period; and provide access to the hardware resources to the untrusted component while the untrusted component is being executed in the trusted execution environment based on the approved privileges.

10. The system of claim 9, wherein the boot sequence comprises a plurality of components to perform a boot process of the boot sequence, the plurality of components comprising the untrusted component, and the instructions when executed cause the hardware processing resource to:

associate a first flag with the untrusted component, the first flag set to a first value indicating that the untrusted component is untrusted; and associate a second flag with a further component of the plurality of components. the second flag set to a second value indicating that the further component is trusted.

11. The system of claim 9, wherein the untrusted component comprises one or more of a bootloader, an operating system, a kernel, a driver, or a master boot record included in the boot sequence for performing one of hardware analysis or testing of the system.

12. The system of claim 9, wherein the instructions when executed cause the hardware processing resource to establish the secure communication channel for encrypting the signature and the approved privileges during the transferring from the untrusted execution environment to the trusted execution environment.

13. The system of claim 9, further comprising a display to display a plurality of options associated with the privilege rights for user selection, wherein the privilege rights include one or more of access to storage, access to an input-output bus, access to a radio resource, or access to an ethernet LAN port.

14. The system of claim 10, wherein the first flag when set to the first value indicates that a signature for the untrusted component is invalid, and the second flag when set to the second value indicates that a signature for the further component is valid.

15. A non-transitory machine-readable medium storing instructions executable by a processing resource to:

identify an untrusted component in a boot sequence in a trusted execution environment of a system, wherein the trusted execution environment allows execution and isolation of a trusted component, and the untrusted component is installed in the trusted execution environment;

defer a secure boot authentication of the untrusted component for a predetermined period;

restrict the untrusted component from accessing hardware resources;

obtain, at a workload in an untrusted execution environment of the system, an image digest and privilege rights associated with the untrusted component in the trusted execution environment, wherein the image digest is produced by a cryptographic operation applied on the untrusted component in the trusted execution environment, the privilege rights include access to the hardware resources, and the untrusted execution environment is separate from the trusted execution environment and connected to the trusted execution environment by a secure communications channel;

send, from the workload, a request including the image digest and the privilege rights to a central node over a secure connection;

receive, at the workload from the central node, a response including approved privileges and a signature based on the image digest;

transfer the signature and the approved privileges from the workload in the untrusted execution environment to the trusted execution environment;

authenticate the untrusted component in the trusted execution environment using the signature before expiry of the predetermined period; and provide access to the hardware resources to the untrusted component while the untrusted component is being executed in the trusted execution environment based on the approved privileges.

16. The non-transitory machine-readable medium of claim 15, wherein the boot sequence comprises a plurality of components to perform a boot process of the boot sequence, the plurality of components comprising the untrusted component, and the instructions are executable by the processing resource to:

associate a first flag with the untrusted component, the first flag set to a first value indicating that the untrusted component is untrusted; and associate a second flag with a further component of the plurality of components, the second flag set to a second value indicating that the further component is trusted.

17. The non-transitory machine-readable medium of claim 15, wherein the untrusted component comprises one or more of a bootloader, an operating system, a kernel, a driver, or a master boot record included in the boot sequence for performing one of hardware analysis or testing of the system.

18. The non-transitory machine-readable medium of claim 15, wherein the untrusted component comprises testing software to perform an analysis to identify a defect in the system.

19. The non-transitory machine-readable medium of claim 15, wherein the instructions to authenticate the untrusted component comprise instructions to verify the signature using a public key of the untrusted component.

20. The non-transitory machine-readable medium of claim 15, wherein the workload in the untrusted execution environment is a signed workload with a verified signature.

\* \* \* \* \*